United States Patent [19]

Ng

[11] Patent Number: 5,377,757

[45] Date of Patent: Jan. 3, 1995

[54] LOW TEMPERATURE EPOXY SYSTEM FOR THROUGH TUBING SQUEEZE IN PROFILE MODIFICATION, REMEDIAL CEMENTING, AND CASING REPAIR

[75] Inventor: Ricky C. Ng, Dallas, Tex.

[73] Assignee: Mobil Oil Corporation, Fairfax, Va.

[21] Appl. No.: 173,038

[22] Filed: Dec. 27, 1993

Related U.S. Application Data

[63] Continuation-in-part of Ser. No. 994,853, Dec. 22, 1992, Pat. No. 5,295,541, and a continuation-in-part of Ser. No. 35,101, Mar. 19, 1993.

[51] Int. Cl.$^6$ ............... E21B 29/10; E21B 33/138; E21B 43/24
[52] U.S. Cl. ............................ 166/277; 166/272; 166/295
[58] Field of Search ............... 166/277, 272, 295

[56] References Cited

U.S. PATENT DOCUMENTS

| | | | |
|---|---|---|---|
| 2,447,629 | 8/1948 | Beissinger et al. | 166/277 X |
| 2,495,352 | 1/1950 | Smith | 166/277 |
| 3,111,991 | 11/1963 | O'Neal | 166/277 X |
| 3,194,310 | 7/1965 | Loomis | 166/277 X |
| 3,918,521 | 11/1975 | Snavely, Jr. et al. | 166/272 |
| 3,967,681 | 7/1976 | Curzon | 166/277 |
| 4,489,783 | 12/1984 | Shu | 166/272 |
| 4,617,996 | 10/1986 | Shu | 166/273 |
| 4,756,369 | 7/1988 | Jennings, Jr. et al. | 166/272 |
| 4,844,163 | 7/1989 | Hazlett et al. | 166/270 |
| 5,178,219 | 1/1993 | Striech et al. | 166/289 |

*Primary Examiner*—Stephen J. Novosad
*Attorney, Agent, or Firm*—Alexander J. McKillop; George W. Hager, Jr.; Charles A. Malone

[57] ABSTRACT

A method for zone isolation, profile modification, remedial cementing, or replacing a damaged or corroded casing with a solid plastic is described. A solidifiable epoxy resin mixture, containing a critical amount of a hardener and curing agent for improved pumpability, is placed into a wellbore so as to bind with undamaged casing and close off any thief zones. Subsequently, the epoxy resin mixture forms a hardened solid underwater and/or at low wellbore temperatures that is able to withstand downhole stresses. The hardened solid is milled out if necessary so as to form a resinous casing the size of the original casing. Later, the hardened resinous casing is perforated to communicate with a targeted zone. Perforation is not required when isolating a zone. The hardened solid is of a strength sufficient to withstand stresses generated during EOR operations such as carbon dioxide or steam-flooding. Said solid is also resistant to workover acids and other chemicals used in EOR operations.

47 Claims, 3 Drawing Sheets

LOW TEMPERATURE EPOXY SYSTEM FOR THROUGH TUBING SQUEEZE IN PROFILE MODIFICATION, REMEDIAL CEMENTING, AND CASING REPAIR

This is a continuation-in-part of application Ser. No. 07/994,853 filed on Dec. 22, 1992 and application Ser. No. 08/035,101 filed on Mar. 31, 1993.

FIELD OF THE INVENTION

This invention is directed to a tubing squeeze method for zone isolation or profile modification, and repair or replacement of a damaged section of wellbore casing located in a subterranean formation.

BACKGROUND OF THE INVENTION

During the course of well drilling operations, a wall of a wellbore being drilled is generally sealed and stabilized by means of a protective steel casing which is lowered through a wellbore. Afterwards, the casing is cemented in place after retrieval of the drilling assembly. Setting a steel casing in a well is a time consuming and expensive procedure. Since the wellbore is essential to removing desired fluids from a subterranean formation, it is necessary that the wellbore's casing remain intact to make for a more efficient operation and avoid the loss of wellbore fluids into the formation.

Often during the production of hydrocarbonaceous fluids or other desired fluids from a formation via a wellbore, the wellbore becomes damaged or corroded. The damage may be caused by excessive pressure within the wellbore which will cause a section of wellbore casing to fail thereby interfering with its integrity. Also, wellbores which are located at levels in excess of about 5,000 ft. will often have an environment where high temperatures, high pressures, and corrosive chemicals are encountered. When these chemicals, pressures and temperatures combine, casing corrosion often occurs thereby necessitating the repair of a section of the casing so as to maintain its integrity thereby avoiding a loss of desired fluids into the formation.

Depending upon the composition of the casing which is used in the wellbore, the expense of replacing the wellbore's casing can vary. When stainless steel casings are used for example, replacement costs can be substantial. For these reasons, it is desirable to have a method for repairing the casing in the wellbore so as to maintain the efficiency of operations for removing desired fluids from the formation while at the same time minimizing downtime and repair costs. Heretofore, it has been necessary to remove the entire wellbore casing and replace it with new casing. This of course is a time consuming and expensive operation.

Often the wellbore is filled with fluids, particularly brine, which interfere with the integrity of many gel systems utilized for zone isolation. During zone isolation, the integrity of a subsequently formed gel or blocking agent is compromised by enhanced oil recovery (EOR) operations which employ steam, hydrocarbonaceous fluids, water, or carbon dioxide. Carbon dioxide can cause a gel or blocking agent, such as cement, to deteriorate in an acid environment which shortens its life and minimizes its effectiveness. Low temperatures encountered in some formations also keep some gels or blocking agents from making effective gels or blocking agents.

Additionally, when some blocking agents are utilized, the time required for placing these blocking agents at a desired location in the formation may require a placement or pumping time of about 3–4 hours. During this time period, a pumpable blocking agent will sometimes set up or harden during a tubing squeeze operation. When this occurs, the squeezing operation cannot be completed and the tubing utilized may have to be discarded.

Therefore, what is needed is a simple and inexpensive tubing squeeze method for zone isolation, and repair or replacement of a wellbore casing in situ that extends placement or pumping time so as to avoid loss of operational time, the production of desired fluids from the formation, or diversion of injection fluids to the oil-bearing formation when low temperatures are encountered.

SUMMARY OF THE INVENTION

In one embodiment of this invention, a section of corroded or damaged casing is removed from the wellbore. This can be achieved by various operations such as milling. Afterwards, if required, the section is further prepared with under reaming to a desired size. A drillable mechanical packer can be placed below the section of the wellbore from which the corroded or damaged casing was removed so as to allow a solidifiable mixture to fill the void created by removal of said section by containing the mixture thereabove. Subsequently, the solidifiable mixture is flowed or squeezed via a tubing into the voided section from which the damaged or corroded casing was removed. Flow or pumping time of the solidifiable mixture comprising an epoxy is lengthened or extended by placing a critical amount of a hardener and a curing agent into said mixture. Thus, substantially more effective mixture placement is obtained.

The solidifiable mixture is allowed to remain in the vicinity of the wellbore from which the damaged or corroded section has been removed. It remains there for a time sufficient to form a solid plastic or resin. Where a drillable mechanical packer is used a solid will be formed thereabove. The solidifiable material forms a solid in the wellbore and the voided section which previously contained the damaged or corroded casing. The solid which forms is of a composition sufficient to withstand environmental conditions encountered at the wellbore depth from which the damage or corroded section of wellbore casing was removed. This solid also forms a bond with the undamaged or corroded casing so as to prevent liquid or gaseous fluids from flowing therethrough.

Subsequently, solid material within the wellbore is removed, preferably by drilling so as to establish communication with the formation and the surface via the wellbore. Where a mechanical packer is utilized it too is drilled out. Once excess solid material has been removed from the wellbore, the remaining solid material reestablishes the integrity of the wellbore casing. The wellbore is now of a diameter substantially similar to the casing prior to its being repaired.

The solidifiable material which is used herein is comprised of a resin/curing agent material formulated to have substantially increased pumping time which hardens in situ under low temperatures to form a solid plastic material. Any solid which is formed via said material should be of a composition sufficient to withstand environmental conditions, pressures, and temperatures located at the depth where the damage or corrosion occurs.

In another embodiment, the solidifiable material is pumped into a damaged part of the wellbore without underreaming or removal of any damaged portion of the wellbore. Upon hardening, a damaged portion of the wellbore is repaired. If required excess hardened material can be removed by drilling.

Another embodiment uses the solidifiable material to isolate or prevent fluid flow from a perforated wellbore into an undesired zone or area of the formation.

It is therefore an object of this invention to replace a damaged or corroded wellbore casing by use of materials in situ so as to avoid removing the steel casing from the wellbore.

It is another object of this invention to provide for a simple, safe, economical, and effective means of repairing or replacing a damaged or corroded section of a wellbore in situ by utilizing an epoxy resin mixture with substantially improved placement or pumping time.

It is yet another object of this invention to provide for a wellbore casing replacement material, which is equal to or better in composition than the original casing so as to withstand environmental conditions encountered within the wellbore, particularly deep wellbores.

It is yet another object of this invention to provide for a wellbore casing replacement material, which is equal to or better in composition than the original casing so as to withstand environmental conditions encountered within the wellbore, particularly where low temperatures and various acidic or alkaline conditions are encountered.

It is a still yet further object of this invention to provide for an epoxy resin system or composition that can form a solid in a low temperature and underwater environment which solid can withstand said environment and subsequent enhanced oil recovery (EOR) methods.

BRIEF DESCRIPTION OF THE PREFERRED EMBODIMENTS

Figure 1:
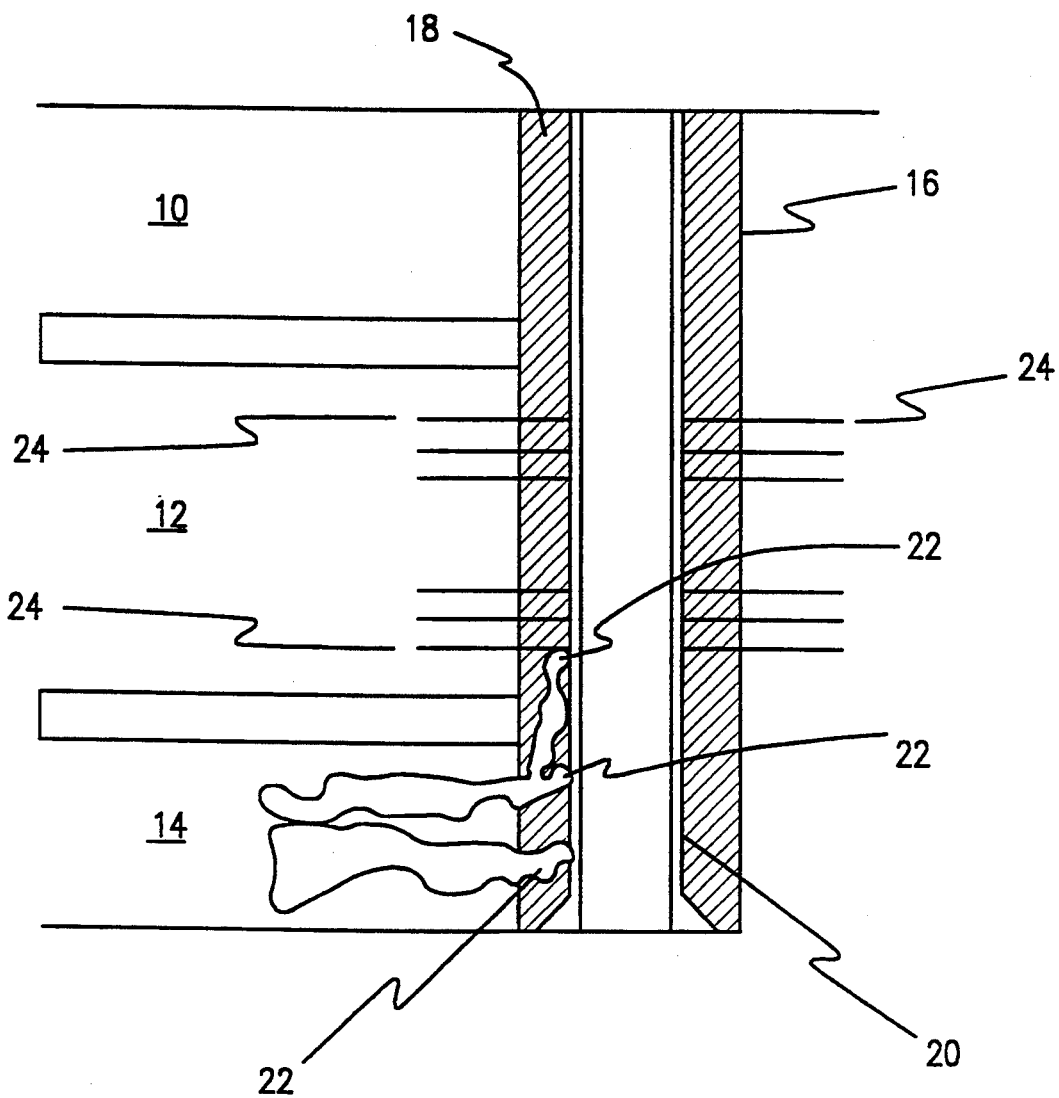
FIG. 1 is a schematic representation of a cased wellbore where channels have been made in the casing thereby communicating the wellbore with a thief zone.

As is shown in FIG. 1, a wellbore penetrates formation 10, producing zone 12, and thief zone 14. The borehole contains cement 18 and casing 20. During the removal of hydrocarbonaceous or other desired fluids from the formation, conditions existing at the lower portion of the wellbore have caused casing 20 to be damaged by channels 22. These channels 22 allow fluids to move from the wellbore into a thief zone 14. Ordinarily, it would be necessary to squeeze the thief zone and channels with cement. However, a cement squeeze often is not effective because cement has low penetration characteristics due to the particulates in the cement. Liquid resin can penetrate small channels and even into the formation.

Figure 2:
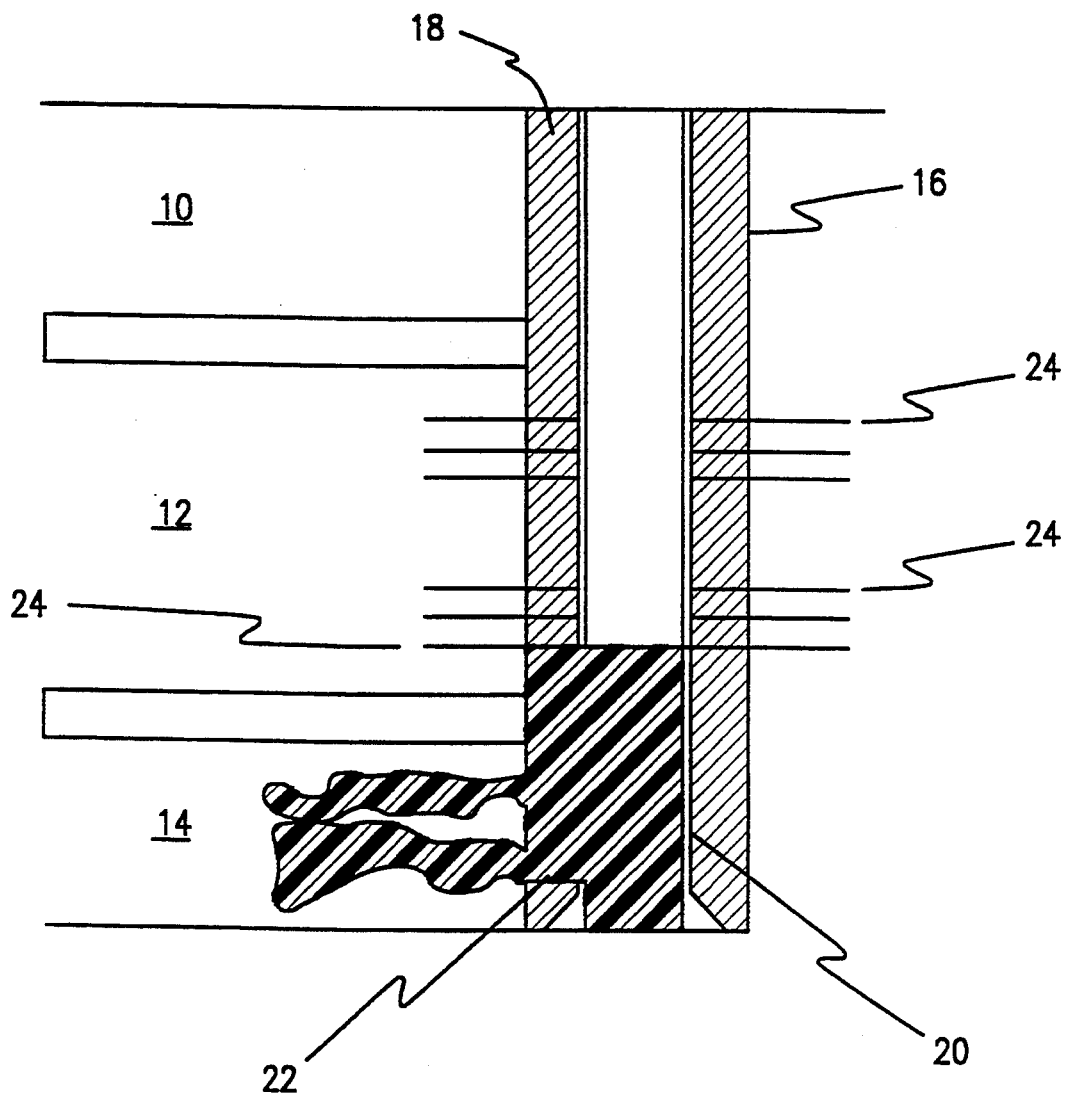
FIG. 2 is a schematic representation which details the formation of a solid plastic in the wellbore and also in the area of the wellbore where the casing has been removed and underreamed. Additionally, it shows the solid plastic in a thief zone which communicated previously with the wellbore.

In the practice of this invention, as is shown in FIG. 2, a portion of casing 20 that contains channels 22 which communicate with thief zone 14 has been removed. After removing the damaged casing containing channels 22, borehole 16 is underreamed to a desired size at a location just below perforations 24 above channels 22. Thereafter, a solidifiable mixture formulated to obtain extended placement time is flowed or squeezed into casing 20 whereupon it also penetrates via channels 22 into thief zone 14. The solidifiable mixture is allowed to remain in the wellbore and thief zone 14 so as to form a thick solid wall which is able to withstand environmental conditions encountered at a preferred depth in formation 10. After the solidifiable mixture has formed a solid, a drilling operation is conducted within the wellbore to remove excess solid material from the wellbore. The underreaming provides the desired thickness of the plastic casing to withstand the downhole stress.

Once the solid material is removed from the wellbore, the casing is comprised of the remaining solid plastic material that abuts the metal casing which was already in the wellbore. Any solidifiable material which flowed into thief zone 14 remains therein as a solid. The completed wellbore casing containing the repaired section comprised of the solid material is shown in FIG. 3.

Figure 3:
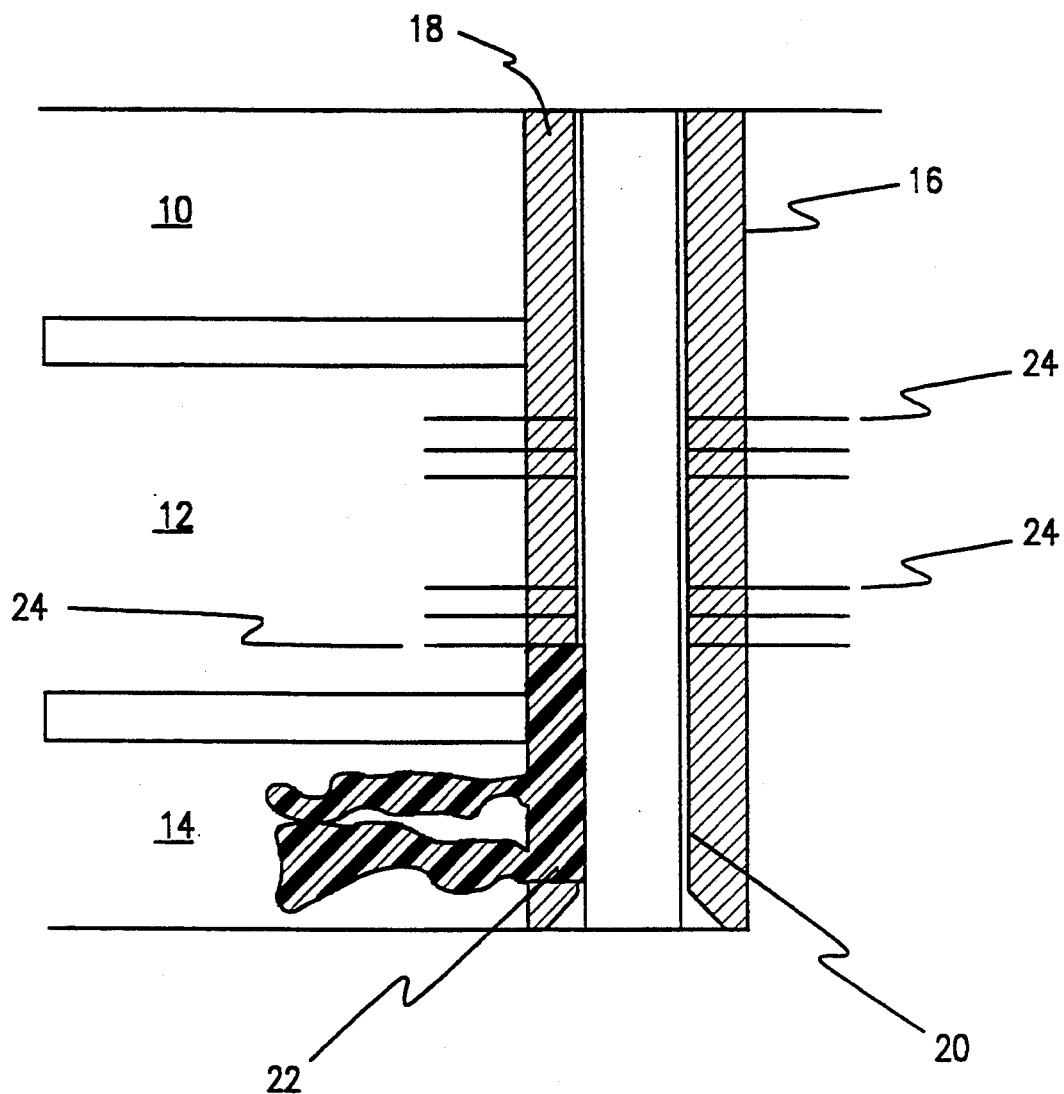
FIG. 3 is a schematic representation which shows replacement of the damaged or corroded casing and cement behind the casing by the solid plastic after removing excess solid material from the wellbore.

In those situations where it is desired to repair a damaged or corroded section of casing 20 at a level higher than the bottom of the wellbore as is shown in FIGS. 1, 2, and 3 a drillable mechanical packer can be placed below the portion of the casing which it is desired to repair or replace. Once the drillable packer has been positioned as desired in the wellbore, the solidifiable mixture formulated to have extended placement or pumping time is flowed into the wellbore. Thereafter it is placed on the drillable packer whereupon it flows into channels which communicate with a thief zone or other zone of the formation. Subsequently, the solidifiable mixture will form a solid plastic which is later drilled out along with the drillable packer. Once this has been done, the well can be produced as desired. The solidifiable material can comprise a resinous material.

This solidifiable material can be used to isolate zones of a formation to prevent gravity override and for profile control. Gravity override and profile control are discussed in U.S. Pat. No. 4,844,163 which issued to Hazlett et al. on Jul. 4, 1989. This patent is hereby incorporated by reference herein.

One method for placing the resinous material into the formation is by use of a positive displacement dump bailer. This is a mechanical device, symmetrical in shape, which is filled with a mixture of resinous material and an acid or alkaline curing agent. It is lowered into the wellbore by a cable. The bailer is positioned at the desired depth above the damaged casing or packer and when activated, releases a metal bar in the top of the device. The bar falls downward inside the device and impacts the top of the fluid creating a downward-moving shock wave which travels through the fluid column contained in the bailer. The shock wave causes a shearing of metal pins in the bottom of the bailer and a subsequent downward movement of the small piston. This small piston uncovers ports to allow a release of the resinous material. The bar continues to fall through the bailer as fluid is released through the ports. The weight of the metal bar effectively adds to the weight of the fluid column being dumped. As the bar falls to the bottom of the bailer, the cylindrical bailer is wiped clean of the resinous material containing an acid or alkaline curing agent.

Other types of positive displacement dump bailers, which operate in a similar manner, may also be used. It is possible to deliver the resinous viscous material with curing agent therein in an open gravity-feed dump bailer. This is a bailer which is open at the top and closed at the bottom. When activated, the bottom cover, which is held by metal pins, is sheared by an explosive or by other means so as to open the bottom. Opening the bottom allows the resinous viscous material with curing agent therein to flow by gravity from the bottom of the bailer and into the damaged casing area and thief zone 14.

Another method for placement of the resinous viscous material is by use of a technique used in squeeze cementing. Of course, the resinous viscous material is substituted for the cement. A squeeze cementing technique is disclosed in U.S. Pat. No. 5,178,219 which issued to Striech et al. on Jan. 12, 1993. This patent is hereby incorporated by reference herein. The technique provides for perforating a wellbore above and below a desired well formation on a single wireline trip and setting a lower packer on a wireline above the lower perforations. A stinger is positioned in the lower packer, and secondary packer elements on an upper packer are set above the upper perforations.

Cementing of the lower perforations is carried out through the lower packer. The secondary packer elements are unset, and the stinger is repositioned adjacent to the upper perforations. Primary packer elements on the upper packer are then set, and the cementing of the upper perforations is carried out through the upper packer and stinger. Setting of the secondary packer elements require only vertical movement of the tubing string and no rotation. Both cementing steps are carried out on a single tubing trip. The upper packer is retrievable, and the lower packer is of a drillable type. Hydraulic slips may be provided on the upper packer to prevent movement thereof during either cementing operation. Although this squeeze cementing technique has been discussed, other squeeze cementing methods can be utilized as will be understood by those skilled in the art.

A coiled tubing may also be used to place the viscous resinous material at the site from which the damaged casing has been removed. The coiled tubing consists of a one-inch or other small pipe which is wound on a spool at the surface of borehole 16. Inflatable packers are sometimes attached to the end of the tubing for zone isolation during the squeeze process. The viscous resinous material and curing agent therein are placed in the end of the tubing and held in place by wiper balls at the top and at the bottom of the resinous material. The tubing is then uncoiled and lowered into the wellbore above the site where it is desired to replace the casing. Thereafter, the viscous resinous material with a critical amount of a hardener and a curing agent therein is pressured through the tubing and released into the wellbore where it freely flows into the thief zone via channels 22 and contacts casing 20. The addition of a critical amount of the hardener and curing agent substantially improves placement or pumping time. Here it forms a solid in the wellbore 16 and thief zone 14. As is shown in FIG. 2, the resinous material enters thief zone 14 via channels 22. Because the resinous material with curing agent therein is fast acting, a solid is formed in the wellbore and thief zone 14. This material, of course, can be held in place by a drillable packer if required. The material is allowed to harden in thief zone 14 and the wellbore.

The preferred resinous material for use herein comprises an epoxy or similar copolymer resin, a curing agent, a reactive diluent, a hardener in a critical amount and a filler. When cured, the resinous material forms a hardened solid. This hardened solid is characterized in that it has a high compressive strength, is resistant to oil field chemicals and high temperatures. It is further characterized in that it has good bonding strength, is able to cure at low temperatures and in an underwater environment.

An epoxy resin which can be utilized herein comprises Shell's EPON-828 ®, a bisphenol-A epichlorohydrin epoxy resin with an epoxide equivalent weight of 185-192. Another epoxy resin that can be used is Shell's EPON DPL-862, a bisphenol-F epichlorohydrin epoxy resin with an epoxide equivalent weight of 166-177. Yet another resin which can be used is an epoxy-novolac type resin which can be purchased from CVC Specialty Chemicals Inc., located in Cherryhill, N.J.

The epoxy resin is blended with a reactive diluent and a filler. An example of the reactive diluent is Scherling Berlin's Diluent 7, a monofunctional glycidyl ether based on alkyl groups of $C_8$-$C_{10}$. The diluent is used to increase pot life or gel time of the epoxy resin and to increase load capacity for the filler. In some cases, a large amount of filler (up to 50% by weight relative to the epoxy resin) is added to the resin mixture. It serves to increase the specific gravity of the resin mixture for gravity dump-bailing applications and for application in deep wells. The filler is also used as a heat sink to allow more working time. An example of the filler is a fine powder of calcium carbonate or silica flour. A crosslinking or curing agent is then added to the resin mixture. This makes a fast-reacting gel which hardens in a short period of time.

For typical oil field applications such as injection profile control, remedial cementing, and casing repair, epoxy curing agents manufactured by Cardolite Inc. can be used. These curing agents are sold under the NC-540, NC541, and NC-541 LV tradenames and can be purchased from Cardolite Inc. which is located in Newark, N.J. These curing agents are phenalkamine compounds with a long hydrocarbon chain attached to a phenoxy group. This makes them especially useful for applications where low temperatures and/or an underwater environment are encountered. This curing agent participates in the crosslinking mechanism and forms a hard resin. Phenalkamine curing agents display a strongly hydrophobic behavior after mixing with an epoxy resin. Thus, they are suitable for downhole applications where the epoxy system may mix with the wellbore fluids, typically brine. Hydrophobic behavior of the epoxy system ensures that the epoxy system will form a hard solid even when some mixing with wellbore brine occurs.

The phenalkamine curing agent will cure within two hours when mixed with a stoichiometric amount of epoxy resin. This property is only good for dump-bailing applications. In order to use the epoxy system for through tubing squeeze, a long placement or pumping time is desired. One simple way to increase the pot life or pumping time of the epoxy system is to reduce the amount of curing agent. However, the property of the final product is not desirable when incomplete curing occurs due to the use of an insufficient amount of curing agent. Thus, a long pot life catalytic hardening agent is used in conjunction with the Cardolite phenalkamine to provide long pumping time and to preserve the low temperature underwater curing characteristics.

Dimethylaminomethylphenol (DMAMP) is blended with the curing agent, epoxy resin, and diluent. One such DMAMP is sold by Chempro Specialties, Inc. as "Conac-10" accelerator/hardening agent. Although it is known to use DMAMP as an accelerator or hardening agent, it has unexpectedly been found that this compound is compatible with the phenalkamine curing agent. More importantly, the combination of these compounds will extend the placement or pumping time of the solidifiable resinous material when blended therein in critical amounts. It has been found that the use of 1.0 to about 3.0 wt % (based on the weight of epoxy resin) of DMAMP, such as the Conac-10, blended with 15 to about 25 wt % of phenalkamine, such as Cardolite's NC-541-LV, will extend the placement or pumping time for the resinous solidifiable material to more than 3 hours at low temperatures (about 90° to 120° F.).

The fast reacting phenalkamine acts as a crosslinking agent for the epoxy. The slower cure DMAMP acts as a catalytic hardening agent to ensure complete curing of the unreacted epoxy by homopolymerization. This unique combination of curing agent and hardener preserves all the characteristics of low temperature, underwater curing, and long pumping time. In field applications, this translates to effective through tubing resin placement without the need for a preflush. A preflush of fresh water or diesel oil is commonly used in squeeze operations. The preflush serves to avoid contamination of brine-sensitive cements, resins, or polymer solutions with wellbore brine during the squeeze process. For example, high salt content in a kill fluid in the wellbore can prematurely set the cement into a solid without the preflush. In contrast, the epoxy curing agent/hardener mixture is easy to apply without much risk of the resinous material either prematurely hardening or being unable to form a solid at low wellbore temperatures.

With the additional time available for placing the resinous material, a more complete and effective placement of the resinous material in a desired location within the formation or wellbore is obtained. When pumped through workover tubing or coiled tubing during a squeeze operation, mixing a critical amount of DMAMP and phenalkamine curing agent into the resinous material increases the pot life or pumping time of over 3 hours at low wellbore temperatures. After placement into a desired area of the formation or wellbore, the epoxy resinous material hardens into a high strength solid in about 48 hours at low wellbore temperatures. Inclusion of DMAMP into resinous material with the phenalkamine curing agent does not affect adversely said material's mixing with wellbore fluids. It provides an added benefit of facilitating pumping through workover tubing or coiled tubing when squeezing off unwanted perforations or near wellbore areas or zones.

In order to confirm the effectiveness of this system, laboratory tests were conducted. In these tests, Cardolite NC-phenalkamine curing agent was mixed with DMAMP and the aforementioned epoxy resins. After two days of curing at a temperature of about 105° F., the epoxy system formed a hard solid having a compressive strength of at least 7,000 psi. This test, which simulated an application for an underwater environment, confirmed that the epoxy system can cure to a hard solid when the wellbore is full of brine.

Samples of the hard solid above obtained from crosslinking the epoxy resin with the phenalkamine curing agent and DMAMP hardener were tested for resistance to carbon dioxide and hydrochloric acid. The samples were placed in two autoclaves and tested at a temperature of 105° F. for one week. One autoclave contained highly saturated carbon dioxide at 3,000 psi. The other contained a 28 wt % solution of hydrochloric acid. When examined, the sample showed substantially no physical deterioration and sustained a failure with compressive strength of over 7,000 psi, thereby demonstrating that the sample was chemically resistant to high pressure carbon dioxide as well as being tolerant to a strong acid. Although other samples showed a dry weight gain of about 214 3 wt. % after exposure to the carbon dioxide, the residual strength of the samples was at least about 7,000 psi. The integrity of the samples were substantially preserved.

Where it is desired to obtain a slightly higher temperature cure Schering Berlin's Euredur ® 3123, a polyamide epoxy curing agent, can be blended with Cardolite curing agents to increase pot life.

For underwater and/or low temperature applications, another curing agent, Schering Berlin's Euredur 3254, can also be used. This curing agent contains a Mannich base aliphatic polyamine attached to a phenol group.

To promote faster curing, a catalytic tertiary amine can also be blended with the aforementioned curing agents. For high temperature applications, an anhydride such as Ashland Chemical Company's phthalic anhydride or a liquid anhydride of methyl tetrahydrophthalic anhydride can be used.

The concentration and volume of curing agent utilized must be customized according to the temperature of the well right before the dump-bailing or pumping through tubing squeeze operation. This allows the resin to have enough placement or pump time and to harden in one to two days. The amount of various batches of the resinous material to be utilized depends on the hole size to be filled. The resin plugs the bottom of thief zone 14 and binds with the undamaged portion of casing 20.

The resinous or solid plastic which forms should have a fracture toughness able to withstand perforations being placed therein so as to remove fluids from a producing zone. In addition to forming a solid liner, the resinous material or plastic should be able to preclude formation gases and liquids from flowing therethrough.

As mentioned above, in order to thin the epoxy resin thus increasing the pot life, a five to twenty wt% solution of a reactive diluent is utilized. Use of this concentration of diluent allows for efficient draining of the dump-bailer, for pumping through the tubing, for mixing in the batch mixer, and for speeding up resin penetration into any cracks or channels behind the casing. It has also been determined that it is best to use a resin which is substantially fresh. Freshness can be determined by a measurement of the resinous material's viscosity.

In addition to casing repair, the epoxy resin and crosslinking system above mentioned can be utilized in oil field workovers such as zone isolations, profile modification or remedial cementing. When used in zone isolation or remedial cementing, a mechanical packer can be positioned in the wellbore so as to prevent solidifiable material from entering an undesired zone. Once the desired volume of solidifiable material has been placed into the zone or damaged area, placement of solidifiable material (via methods as mentioned above) into that zone or area is terminated and the material is allowed to form a hardened solid. Excess hardened material can be removed from the wellbore by drilling to minimize damage to the productive zones. After removing excess hardened material from the wellbore, production can be commenced or an enhanced oil recovery (EOR) can be initiated in a desired zone.

The viscosity of the solidifiable material is tailored so as to flow into the zone desired to be isolated or repaired. A desired viscosity can be determined from core samples taken from the formation, existing data, or by use of a survey of the vertical portion of the formation near the wellbore to determine the rate and volume of fluids entering various zones of the formation.

The first of these methods is known as a "spinner survey". In this method, a tool containing a freely rotating impeller is placed in the wellbore. As steam passes the impeller, it rotates at a rate which depends on the velocity of the steam. The rotation of the impeller is translated into an electrical signal which is transmitted up the logging cable to the surface where it is recorded on a strip chart or other recording device.

Radioactive tracer surveys are also used in many situations. With this method methyl iodide (131) has been used to trace the vapor phase. Sodium iodide has been used to trace the liquid phase. Radioactive iodine is injected into the steam between the steam generator and the injection well. Injected tracer moves down the tubing with the steam until it reaches the formation, where the tracer is temporarily held on the face of the formation for several minutes. A typical gamma ray log is then run immediately following the tracer injection. The recorded gamma ray intensity at any point in the well is then assumed to be proportional to the amount of steam injected at that point.

Vapor phase tracers have variously been described as alkyl halides (methyl iodide, methyl bromide, and ethyl bromide) or elemental iodine.

Where desired, a miscible or immiscible, a steam-flooding, $CO_2$-flooding, or water-flooding EOR process can be initiated in either producing zone 12 or thief zone 14 of the formation after zone isolation or remedial cementing of a zone or casing.

Miscible recovery operations are normally carried out by a displacement procedure in which the solvent is injected into the reservoir through an injection well to displace oil from the reservoir towards a production well from which the oil is produced. Because the solvent, typically a light hydrocarbon such as liquid petroleum gas (LPG) or a paraffin in the $C_2$ to $C_6$ range, may be quite expensive, it is often desirable to carry out the recovery by injecting a slug of the solvent, followed by a cheaper displacement liquid such as water.

A flooding process can be carried out under conditions of immiscibility or near-immiscibility by utilizing a displacing fluid such as carbon dioxide and an additive such as ethane which increases the solubility of the displacing fluid in reservoir oil. The additive is injected in a slug with the displacing fluid preferably followed by a slug of water to improve sweep. Afterwards, the displacing fluid alone may be injected to extract residual additive and oil. A number of slugs of displacing fluid, either by itself or with the additive may be injected, with intervening slugs of water and finally, water injection may be made to termination. This process is disclosed by Shu in U.S. Pat. No. 4,617,996 which issued on Oct. 21, 1986. This patent is hereby incorporated by reference herein.

Steam-flooding processes which can be used when employing the procedure described herein are detailed in U.S. Pat. Nos. 4,489,783 and 3,918,521 which issued to Shu and Snavely, respectively. U.S. Pat. No. 4,756,369 describes a use of carbon dioxide in the presence of steam in heavy oil reservoirs to enhance the mobility of heavy oil therein. These patents are hereby incorporated by reference herein.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for repairing a damaged or corroded wellbore casing located within a wellbore comprising:
    a) directing a solidifiable epoxy resin mixture into a damaged or corroded section of said wellbore casing which solidifiable mixture is in an amount sufficient to fill a space or void existing in said damaged or corroded section where said mixture contains a critical amount of a hardener and a curing agent that substantially increases pumpability time of said resin as well as obtaining substantially more complete curing of said resin;
    b) allowing said resin, hardener, and curing agent to remain in said space or void for a time sufficient to form a hardened solid able to more substantially withstand environmental conditions existing in the wellbore while precluding fluid flow therethrough during the recovery of hydrocarbonaceous fluids from an underground formation or reservoir; and
    c) removing any excess solid material from the wellbore so as to form a solid wall bonded to and having a diameter substantially similar to said casing thereby repairing said damaged or corroded section.

2. The method as recited in claim 1 where the solidifiable mixture comprises additionally a diluent and a filler.

3. The method as recited in claim 1 where the solidifiable mixture is directed or flowed into the space or void and wellbore adjacent thereto by a positive displacement dump-bailer.

4. The method as recited in claim 1 where said solidifiable mixture is flowed into the space and wellbore adjacent thereto by pumping through workover tubing or a coiled tubing utilized during a cement squeeze operation.

5. The method as recited in claim 1 where in step b) the solid which is formed has a fracture toughness able to withstand perforations being placed therein.

6. The method as recited in claim 1 where the hardened solid is able to preclude formation gases and liquids from flowing therethrough.

7. The method as recited in claim 1 where in step c) the solid wall forms a liner with the undamaged or uncorroded casing.

8. The method as recited in claim 1 where the solidifiable mixture is directed into a damaged or corroded section by the placement of a mechanical packer below said section.

9. The method as recited in claim 1 where the solidifiable mixture is hydrophobic and forms a hardened solid at a temperature of about 80° F. which solid is able to withstand temperatures encountered in a steam-flooding EOR operation or to withstand acidic or alkaline conditions encountered in carbon dioxide flooding, water flooding, miscible or immiscible EOR operations.

10. The method as recited in claim 1 where the solidifiable mixture contains a bisphenol-A epichlorohydrin epoxy resin with an epoxide equivalent weight of about 185 to about 192.

11. The method as recited in claim 1 where the solidifiable mixture contains a bisphenol-F epichlorohydrin epoxy resin with an epoxide equivalent weight of about 166 to about 177.

12. The method as recited in claim 1 where the solidifiable mixture contains a bisphenol-A epichlorohydrin epoxy resin, a monofunctional glycidyl ether diluent comprised of $C_8$–$C_{10}$ alkyl groups, dimethylaminomethylphenol hardener, and a phenalkamine epoxy curing agent.

13. The method as recited in claim 1 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent and a dimethylaminomethylphenol hardener.

14. The method as recited in claim 1 where the solidifiable mixture comprises a bisphenol-A epichlorohydrin epoxy resin, a monofunctional glycidyl ether diluent comprised of $C_8$–$C_{10}$ alkyl groups, a phenalkamine epoxy curing agent, a dimethylaminomethylphenol hardener, and a filler.

15. The method as recited in claim 1 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent, a dimethylaminomethylphenol hardener, and a filler.

16. The method as recited in claim 1 where the solidifiable mixture comprises a bisphenol-A epichlorohydrin epoxy resin, a monofunctional glycidyl ether diluent comprised of $C_8$–$C_{10}$ alkyl groups, a Mannich base aliphatic polyamine attached to a phenol curing agent, a dimethylaminomethylphenol, and a filler.

17. The method as recited in claim 1 where the solidifiable mixture contains an epoxy-novolac resin, a monofunctional glycidyl ether diluent comprised of $C_8$–$C_{10}$ alkyl groups, a dimethylaminomethylphenol hardener, and a phenalkamine epoxy curing agent.

18. The method as recited in claim 1 where the solidifiable mixture comprises a bisphenol-F epichlorohydrin epoxy resin, a monofunctional glycidyl ether diluent comprised of $C_8$–$C_{10}$ alkyl groups, a Mannich base aliphatic polyamine attached to a phenol curing agent, a catalytic tertiary amine, a dimethylaminomethylphenol hardener, and a filler.

19. A method for profile modification, remedial cementing, or isolating a zone of a formation or reservoir penetrated by a wellbore comprising:

a) directing a solidifiable epoxy resin mixture into a desired zone of said formation via the wellbore which solidifiable mixture is in an amount sufficient to fill said zone to a desired depth in said formation where said mixture contains a critical amount of a hardener and a curing agent mixture that substantially increases pumpability time of said resin as well as obtaining substantially more complete curing of said resin;

b) allowing said resin, hardener, and curing agent to remain in said zone for a time sufficient to form a hardened solid able to withstand environmental conditions existing in the zone while precluding fluid flow therethrough; and c) removing any excess solid material from the wellbore so as to form a solid wall bonded to and having a diameter substantially similar to said casing thereby isolating said zone from fluid flow.

20. The method as recited in claim 19 where the solidifiable mixture comprises additionally a diluent, and a filler.

21. The method as recited in claim 19 where the solidifiable mixture is directed or flowed into the zone or void and wellbore adjacent thereto by a positive displacement dump-bailer.

22. The method as recited in claim 19 where said solidifiable mixture is flowed into the space and wellbore adjacent thereto by pumping through workover tubing or a coiled tubing.

23. The method as recited in claim 19 where in step b) the solid which is formed has a fracture toughness able to withstand perforations being placed therein.

24. The method as recited in claim 19 where the hardened solid is able to preclude formation gases and liquids from flowing therethrough.

25. The method as recited in claim 19 where in step c) the solid wall forms a liner with the undamaged or uncorroded casing.

26. The method as recited in claim 19 where the solidifiable mixture is directed into a damaged or corroded section by the placement of a mechanical packer below said section.

27. The method as recited in claim 19 where the solidifiable mixture is hydrophobic and forms a hardened solid at a temperature of about 80 degrees F. which solid is able to withstand temperatures encountered in a steam-flooding EOR operation or to withstand acidic or alkaline conditions encountered in carbon dioxide flooding, water flooding, miscible or immiscible EOR operations.

28. The method as recited in claim 19 where said solidifiable mixture is flowed into the space and wellbore adjacent thereto by a squeeze cementing technique.

29. The method as recited in claim 19 where the solidifiable mixture contains a bisphenol-A epichlorohydrin epoxy resin, a monofunctional glycidyl ether diluent comprised of $C_8$–$C_{10}$ alkyl groups, a dimethylaminomethylphenol hardener, and a phenalkamine epoxy curing agent.

30. The method as recited in claim 19 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent, and a dimethylaminomethylphenol hardener.

31. The method as recited in claim 19 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent, a dimethylaminomethylphenol hardener, and a filler.

32. The method as recited in claim 19 where the solidifiable mixture comprises a bisphenol-A epichlorohydrin epoxy resin, a monofunctional glycidyl ether diluent comprised of $C_8$–$C_{10}$ alkyl groups, a Mannich base aliphatic polyamine attached to a phenol curing agent, a dimethylaminomethylphenol hardener, and a filler.

33. The method as recited in claim 19 where the solidifiable mixture contains an epoxy-novolac resin, a monofunctional glycidyl ether diluent comprised of $C_8$–$C_{10}$ alkyl groups, a dimethylaminomethylphenol hardener, and a phenalkamine epoxy curing agent.

34. A method for profile modification, remedial cementing, or isolating a zone of a formation or reservoir penetrated by a water containing wellbore comprising:
  a) directing a solidifiable epoxy resin mixture into a desired zone of said formation via the wellbore which mixture is unaffected by said water and the solidifiable mixture is in an amount sufficient to fill said zone to a desired depth in said formation and which additionally contains a critical amount of a hardener and curing agent mixture that substantially increases pumpability time of said resin as well as obtaining substantially more complete curing of said resin;
  b) allowing said resin and curing agent with hardener therein to remain in said zone for a time sufficient to form a hardened solid at a temperature of about 80 degrees F. which solid is able to withstand environmental conditions existing in the zone while precluding fluid flow therethrough; and
  c) removing any excess solid material from the wellbore so as to form a solid wall bonded to and having a diameter substantially similar to said casing thereby isolating said zone from fluid flow.

35. The method as recited in claim 34 where after step c) a steam-flooding, carbon dioxide flooding, water-flooding, miscible or immiscible EOR method is initiated in another zone of said formation.

36. The method as recited in claim 34 where solidifiable mixture is flowed into the space and wellbore adjacent thereto by a positive displacement dump-bailer.

37. The method as recited in claim 34 where said solidifiable mixture is flowed into the space and wellbore adjacent thereto by pumping through workover tubing or a coiled tubing.

38. The method as recited in claim 34 where the solid which is formed has a fracture toughness able to withstand perforations being placed therein.

39. The method as recited in claim 34 where the solid is able to preclude formation gases and liquids from flowing therethrough.

40. The method as recited in claim 34 where a drillable mechanical packer is placed in the wellbore before flowing the solidifiable mixture into a desired site.

41. The method as recited in claim 34 where the solidifiable mixture comprises a bisphenol-A epichlorohydrin epoxy resin, a monofunctional glycidyl ether comprised of $C_8$–$C_{10}$ alkyl groups, a Mannich base aliphatic polyamine attached to a phenol curing agent, a dimethylaminomethylphenol hardener, and a filler.

42. The method as recited in claim 34 where the solidifiable mixture comprises a bisphenol-F epichlorohydrin epoxy resin, a monofunctional glycidyl ether comprised of $C_8$–$C_{10}$ alkyl groups, a Mannich base aliphatic polyamine attached to a phenol curing agent, a dimethylaminomethylphenol hardener, and a filler.

43. The method as recited in claim 34 where said solidifiable mixture is flowed into the space and wellbore adjacent thereto by a squeeze cementing technique.

44. The method as recited in claim 34 where the solidifiable mixture contains an epoxy-novolac resin, a monofunctional glycidyl ether diluent comprised of $C_8$–$C_{10}$ alkyl groups, a dimethylaminomethylphenol hardener, and a phenalkamine epoxy curing agent.

45. The method as recited in claim 34 where the solidifiable mixture contains a bisphenol-A epichlorohydrin epoxy resin, a monofunctional glycidyl ether diluent comprised of $C_8$–$C_{10}$ alkyl groups, a dimethylaminomethylphenol hardener, and a phenalkamine epoxy curing agent.

46. The method as recited in claim 34 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent, and a dimethylaminomethylphenol hardener.

47. The method as recited in claim 34 where the solidifiable mixture comprises a bisphenol-F epichlorohydrin epoxy resin, a monofunctional glycidyl ether diluent comprised of $C_8$–$C_{10}$ alkyl groups, a phenalkamine epoxy curing agent, a dimethylaminomethylphenol hardener, and a filler.

* * * * *